United States Patent
Van Den Aker

(10) Patent No.: US 7,763,554 B2
(45) Date of Patent: *Jul. 27, 2010

(54) METHOD AND DEVICE FOR FORMING A LONGITUDINAL FIBER WEB AND FOR FORMING A TRANSVERSE FIBER WEB AND FOR FORMING A CROSS FIBER WEB AND FOR FORMING AN AIRBAG

(75) Inventor: Martinus Cornelus Adrianus Van Den Aker, Tilburg (NL)

(73) Assignee: Beiler Beheer B.V., Tilburg (NL)

( * ) Notice: Subject to any disclaimer, the term of this patent is extended or adjusted under 35 U.S.C. 154(b) by 155 days.

This patent is subject to a terminal disclaimer.

(21) Appl. No.: 12/018,491

(22) Filed: Jan. 23, 2008

(65) Prior Publication Data

US 2008/0115882 A1 May 22, 2008

Related U.S. Application Data

(63) Continuation of application No. 11/659,757, filed as application No. PCT/NL2005/000524 on Jul. 19, 2005.

(30) Foreign Application Priority Data

Aug. 9, 2004 (NL) .................................... 1026809

(51) Int. Cl.
*B32B 5/18* (2006.01)

(52) U.S. Cl. ..................... 442/226; 280/728.1; 139/305

(58) Field of Classification Search .............. 280/728.1, 280/730.1, 730.2; 428/34.1, 34.3, 34.5, 34.6, 428/34.7, 35.7, 35.9, 36.1, 36.2, 36.91; 442/185, 442/186, 187, 188, 208, 226, 227, 234; 383/3; 139/305, 306, 383 R, 384 R, 387 R See application file for complete search history.

(56) References Cited

U.S. PATENT DOCUMENTS

| 6,978,808 | B2 * | 12/2005 | Walsh et al. ................... 139/11 |
| 7,201,397 | B2 * | 4/2007 | Keshavaraj .............. 280/743.1 |
| 7,354,063 | B2 * | 4/2008 | Keshavaraj .............. 280/743.1 |
| 2003/0070745 | A1 | 4/2003 | Van Den Aker |
| 2009/0114306 | A1 * | 5/2009 | Van Den Aker ............. 139/390 |

FOREIGN PATENT DOCUMENTS

| EP | 0485892 | 5/1992 |
| JP | 07040341 | 2/1995 |

OTHER PUBLICATIONS

International Search Report for PCT Application No. PCT/NL2005/000524 dated Jan. 20. 2006.

* cited by examiner

*Primary Examiner*—Arti Singh-Pandey
(74) *Attorney, Agent, or Firm*—Troutman Sanders LLP; Ryan A. Schneider

(57) ABSTRACT

A method is described for forming a longitudinal fiber web, wherein synthetic tapes with an elongated cross-sectional contour are positioned substantially parallel to each other for forming a bundle, wherein the tapes are embedded in a matrix material. The tapes are positioned partially overlapping each other.

22 Claims, 10 Drawing Sheets

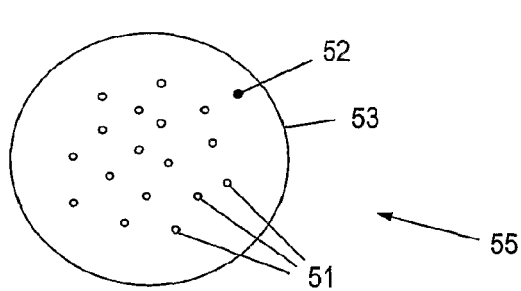
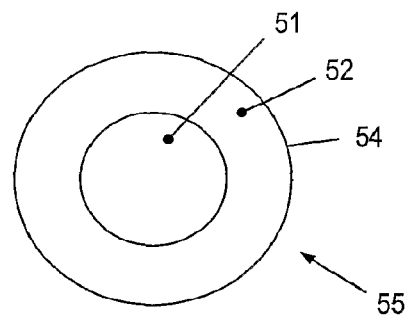
FIG. 5A  FIG. 5B
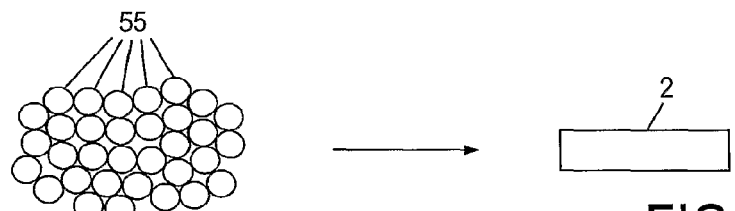
FIG. 5C
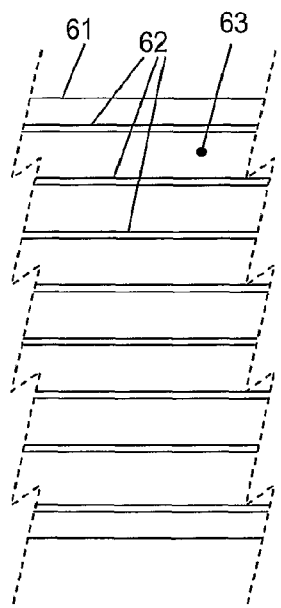
FIG. 6A
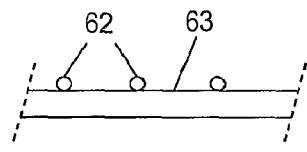
FIG. 6B
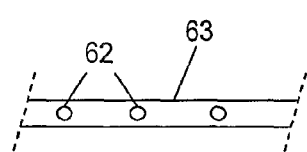
FIG. 6C
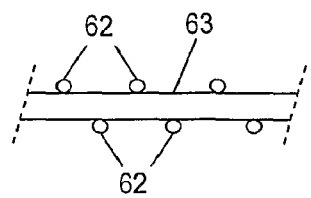
FIG. 6D

METHOD AND DEVICE FOR FORMING A LONGITUDINAL FIBER WEB AND FOR FORMING A TRANSVERSE FIBER WEB AND FOR FORMING A CROSS FIBER WEB AND FOR FORMING AN AIRBAG

CROSS REFERENCE TO RELATED APPLICATION

This application is a continuation of application Ser. No. 11/659,757, filed 8 Feb. 2007, which application is a US National Stage of International Application No. PCT/NL2005/000524, filed 19 Jul. 2005, which claims the benefit of NL1026809, filed 9 Aug. 2004, each of which are incorporated herein by reference.

BACKGROUND OF THE INVENTION

1. Field of the Invention

The present invention relates in general to a method for forming a longitudinal fiber web, wherein substantially mutually parallel synthetic fibers are embedded in a carrier matrix, also of synthetic material, wherein the longitudinal direction of the fibers is directed parallel to the longitudinal direction of the web.

More particularly, the present invention relates to a method for forming such a web in a continuous process, whereby the length of that web may in principle be infinitely large; such a web will hereinafter be indicated by the phrase "continuous" web.

2. Description of the Prior Art

Manufacturing a longitudinal fiber web in a continuous process is known per se. By way of example, reference is made to the Dutch patent 1014995 and the International patent application PCT/NL01/00316 (WO01/083345), of which publications the full content is incorporated here by reference. Basically, this means that a fiber bundle is applied to or embedded in a carrier layer of a material with a lower flow temperature. The structure thus formed is subjected to a thermal treatment, usually with the use of thermal rollers, wherein the combination of carrier layer and fibers is heated to a well-controlled temperature in a temperature range which is chosen such that the carrier layer will flow but the fiber bundle will not. A good adhesion between the fibers and the liquid carrier material comes into being. In the embodiment of the said publications where the fibers are embedded between two carrier layers, after cooling down, the two carrier layers are melted together to a whole that is indicated as carrier matrix. The product formed is subsequently wound on a roll.

It is possible to make a transverse fiber web out of such a longitudinal fiber web by cutting pieces of the longitudinal fiber web and combine them again with each other in an orientation rotated over 90° (or another suitable angle). It is also possible to make a cross fiber web by attaching pieces of longitudinal fiber web rotated over an angle of 90° (or another suitable angle) to a longitudinal fiber web.

Such webs have properties making them particularly suitable as material for manufacturing for example airbags, bullet proof vests, so called "big bags", geotextile, primary backing for carpets, thermally deformable plates, etc. Those properties relate to a combination of inter alia large tensile strength and large flexibility. The strength is provided by the fibers, whereas the primary function of the carrier matrix is supplying a manageable product.

A first specific aspect of the present invention relates to providing the fibers which form the starting point for the said fiber bundle. It is common that these fibers are manufactured by a fiber producer, typically by means of an extrusion process, wherein the fiber formed is wound on a fiber reel. The fiber manufacturer supplies fiber reels to the fiber web manufacturer as stock rolls. For the manufacturing process of a fiber web, the fiber web manufacturer mounts a large number of such stock rolls on a yarn rack.

Some disadvantages are associated with this common method. The necessary steps of winding on reels, transport of the reels, and storage of the reels are considered disadvantages which also involve a cost problem. Moreover, the length of the fiber on a reel is not infinite, and an empty reel will have to be replaced while the production of the fiber web continues. During the time required for replacing a fiber reel, a fiber is thus missing in the web formed, which implies a weaker spot; this problem is all the larger as multiple fiber reels become empty at the same time, and the web parts concerned may be considered as waste. Alternatively, one usually chooses to replace all reels at the same time, also the reels that are not yet empty, which thus means that the fibers remaining on those reels are considered as waste. Further, it is then a problem that it is difficult to connect the web parts without variations in the properties: usually, the consequence is that the webs formed have a finite length.

Thus, it is necessary to make sure that becoming empty of the fiber reels is detected as soon as possible, for example by continuous supervision by personnel and/or special detection apparatus.

BRIEF SUMMARY OF THE INVENTION

It is an important object of the present invention to avoid the said problems.

A second specific aspect of the present invention relates to the product properties of the fiber web formed.

It is desired to be able to vary the product properties. In this context, one can think of the possibility of producing different fiber webs with mutually different product properties, but also of the possibility of producing a single fiber web with product properties varying over the web length.

The product properties may be changed in different ways. It is possible to vary the choice of material, but changing the material is a radical change, and the necessity of having multiple materials in stock increases the costs.

The thickness is also an important product property. Usually, fibers with a substantially circular cross section are used, and a fiber bundle is used of which the thickness corresponds to the thickness of a single fiber. In that case, the fibers are positioned as good as possible in a common plane, against each other (see for example WO01/083345, p. 6, ls. 34-35). In that case, the center/center distance between two adjacent fibers is always substantially equal to the fiber diameter.

If it is desired to vary the thickness of the fiber bundle, this can be achieved by varying the fiber thickness. For obtaining a larger bundle thickness, it would in principle be possible to lay multiple fibers on top of each other, in different layers, but it is difficult to ensure that the fibers indeed remain lying in the different layers, and because of this, it is difficult to ensure the desired homogeneity. Reducing the bundle thickness is only possible by reducing the fiber thickness.

Varying the fiber thickness leads to variations in the tensile strength and in the flexibility. In particular, a larger thickness of the fibers inevitably leads to a reduction of the flexibility. Moreover, if one starts from fibers which are wound on a stock roll or yarn rack, the necessity of having multiple fiber thicknesses in stock, and the necessity of changing stock rolls, also here leads to an increase of the costs, while it is difficult or even impossible to vary the fiber thickness in a desired way over the length of the fiber web.

The tensile strength of the fiber web to be formed is mainly determined by the fiber material; the larger the fiber weight (weight per area unit of the web), the larger the tensile strength, but also the larger the costs of the fiber web. Depending on the intended application of the fiber web to be formed, a high tensile strength is not always needed, and thus the fiber weight might be lowered in order to lower costs. Lowering the fiber weight may be achieved by reducing the fiber diameter, but that is not always desired and/or not always possible.

Therefore, it is an important object of the present invention to provide a method which allows the fiber weight to be lowered in a simple way.

Further, it is an important object of the present invention to provide a method for forming a longitudinal fiber web with which it is possible in a relatively simple way to set and even, during the process, to vary the thickness of the fiber bundle in the longitudinal fiber web.

In particular, the present invention aims at providing a method for forming a longitudinal fiber web, with which it is possible in a relatively simple way to give the fiber bundle in the longitudinal fiber web a thickness which is larger than the thickness of the individual fibers.

A third specific aspect of the present invention relates to a method to increase the strength of the fibers. According to present state of the art, directly after extrusion, the fibers are subjected to a stretch treatment, causing them to become thinner and also stronger. The larger the procentual stretch, the larger the strength increase is. However, in the case of large procentual stretch, the chance of breaking also increases. An additional problem herein is that the fibers have a large velocity during the stretch treatment, which causes the chance of breaking to increase.

It is a further object of the present invention to reduce this problem.

A fourth specific aspect of the present invention relates to forming an open fiber gauze, i.e. a web comprising a first group of substantially mutually parallel first synthetic fibers and a second group of substantially mutually parallel second synthetic fibers, wherein the first synthetic fibers and the second synthetic fibers make an angle with each other which is unequal to zero. In an embodiment wherein the fiber gauze only comprises the first and second groups of fibers, this angle is preferably substantially equal to 90°. However, the invention also foresees an embodiment with a third group of substantially mutually parallel third synthetic fibers, wherein the third synthetic fibers make a first angle unequal to zero with the first synthetic fibers and a second angle unequal to zero with the second synthetic fibers, which two angles are preferably equal to each other (60°). Variations with further groups of synthetic fibers are also foreseen.

A further aspect of an open gauze is that in each group the fibers have a mutual distance, wherein the spaces between the fibers are empty, i.e. substantially free from web material, so that a gauze is permeable. These spaces will hereinafter be indicated with the phrase "pore".

Methods for manufacturing open synthetic gauze are known per se. A known method is an injection molding method, wherein synthetic material in liquid form is inserted into a mould. This method is relatively expensive, does not lead to real fibers, is difficult to implement if it is desired to obtain thin fibers, and it is difficult or even impossible to form a continuous web with this method. The production speed is very low.

Another known method for forming an open synthetic gauze is a weaving method or a knitting method. In both cases, it is necessary to fix the fibers in order to prevent them from sliding. Further, the production speed in weaving and knitting is relatively low.

Another known method for forming an open synthetic gauze is indicated as perforation method. In this case, one starts from a synthetic foil, in which holes (the "pores") are punched. A complicated system of punching cams is needed for this. Also for this method, it applies that it is relatively expensive, does not lead to real fibers, is difficult to implement if it is desired to obtain thin fibers, and has a relatively low production speed. Further, the achieved strength is relatively low.

An important object of the present invention is to eliminate the said disadvantages.

A fifth specific aspect of the present invention relates to a method of forming hollow, foldable and inflatable bodies, for example airbags. Since the present invention relates in particular to airbags, the present invention will hereinafter be explained specifically for this application example, but it is noted with emphasis that this can not be regarded as limitation of the scope of the invention.

The material of an airbag must have various characteristic properties. In the first place, it must be able to be folded to a small packet, in order to be accommodated in a small space such as for example in a steering wheel. Further, it must be air-tight, in order to be able to be inflated, and it must be flexible enough to be able to then unfold quickly to an inflated balloon. Then, it must be strong enough to be able to withstand shock loads. It must be able to maintain all these properties in the folded state for years. Synthetic fibers can offer these properties.

In a known method for manufacturing an airbag, sheets of synthetic fibers are formed by a weaving process. Two of those sheets are placed on each other and fixed to each other, in order to form a bag-like configuration.

In a first known variation, the sheets are subjected to a heat treatment in order to let the fibers shrink so that they also become thicker, in order to let the sheets be air-tight.

In a second known variation, a layer of a resin or a rubber is applied to the tissue formed, in order to let the sheets be air-tight.

For connecting to each other the sheets which are placed on each other, in the known manufacturing techniques, it is necessary that the sheets are sewn to each other. This is a process which requires that a stitching thread with the help of a needle is pulled through the sheets which are placed on each other, which has the inherent disadvantage that the air-tight sheets are perforated.

As further variation, it is still known to manufacture the sheets as a Jacquard double tissue.

An important object of the present invention is providing a manufacturing method that lacks the said disadvantages.

According to an important aspect of the present invention, the fibers are further processed into fiber web straight from the extruder. Thus, the steps of winding, transport, storage and placing of fiber rolls are avoided. Further, it is then possible to form a continuous web in which also the individual fibers are 100% continuous, while, if desired, it is possible to vary the fiber properties such as thickness in a controlled way over the length of the continuous web.

According to another important aspect of the present invention, the longitudinal fiber web is manufactured of fibers of which the cross section has an elongated contour.

According to a further important aspect of the present invention, the fibers in the longitudinal fiber web are positioned in such a way that they at least partially overlap each other. By increasing the amount of overlap, it is possible in a relatively simple way to increase the thickness of the fiber bundle in the longitudinal fiber web.

According to another important aspect of the present invention, the fibers are subjected to a two-stage stretching process. The first stage of the stretching process takes place before the fibers are combined with a carrier layer. The second stage of the stretching process is performed after the fibers have been combined with a carrier layer, i.e. the combination of fibers and carrier layer is stretched. This combination is heated, so that the material becomes softer, after which the second stretching operation is performed.

It has proven that hereby a larger final strength is achievable than in applying a one-stage stretching process. Further, it is an advantage that the stretching process is performed at a relatively low speed.

According to another important aspect of the present invention, the fibers are positioned with mutual intermediate space. Hereby, it is possible to form a fiber gauze.

According to another important aspect of the present invention, an open fiber gauze is formed starting from a longitudinal fiber web, wherein the fibers have been arranged on a carrier layer or embedded between two carrier layers, in which longitudinal fiber web the fibers have mutual intermediate spaces. Of a second longitudinal fiber web, which is composed in a similar way, pieces are cut which, rotated over a suitable angle, are positioned on the first longitudinal fiber web. Thus, a first layer is formed containing the first group of first fibers, and a second layer containing the second group of second fibers. If desired, a third, a fourth etc. layer may be applied.

Subsequently, the webs placed on each other are subjected to a heat treatment, wherein the webs melt together. More particularly, the carrier layers will melt.

Before, during or after the heat treatment, the carrier layers between the mutually crossing fibers are removed in order to thus form open pores. This phenomenon may occur automatically as a result of the heat treatment, because the film-shaped carrier layers become liquid and collapse as a result of the surface tension. Possibly, the carrier layers are perforated in a separate treatment, for example with a mechanical tool or with the aid of an air jet.

As a result of the surface tension present in the carrier layers, after collapsing or perforating, the material of the carrier layers will be pulled to the adjacent fibers, in particular to the fiber crossings, and result in a reinforcement there.

According to another important aspect of the present invention, for forming hollow, foldable and inflatable bodies, for example airbags, a closed fiber gauze is formed starting from a longitudinal fiber web, wherein the fibers have been arranged on a carrier layer or embedded between two carrier layers, in which longitudinal fiber web the fibers have mutual intermediate spaces. Of a second longitudinal fiber web, which is constructed in a similar way, pieces are cut which, rotated over a suitable angle, are positioned on the first longitudinal fiber web. The combination of these two webs is subjected to a heat treatment, causing the two carrier layers to flow into each other and a cross fiber web with a closed gauze structure to come into being. Such a cross fiber web is airtight.

Subsequently, a second cross fiber web, which has been formed in a similar way, is placed on the first cross fiber web, and sealed to the first cross fiber web along a predetermined adhesion line. In this, a strong connection comes into being, because the carrier layers melt together through and through in the spaces between the fibers. Such a way of connecting is not possible with a woven material, because the fibers lying according to an S-curve counteract a good adhesion or, if the temperature is chosen a little too high, the fibers melt together and the material formed becomes very stiff.

BRIEF DESCRIPTION OF THE DRAWINGS

These and other aspects, features and advantages of the present invention will be further explained by the following description with reference to the drawings, in which same reference numbers indicate same or similar parts, and in which.

Figure 2A:
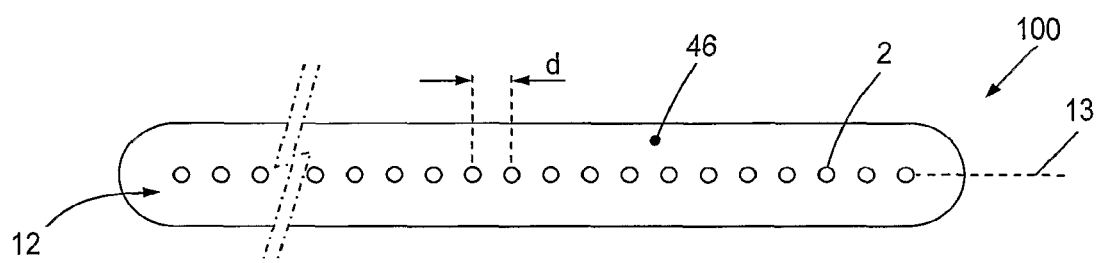
Figure 2B:
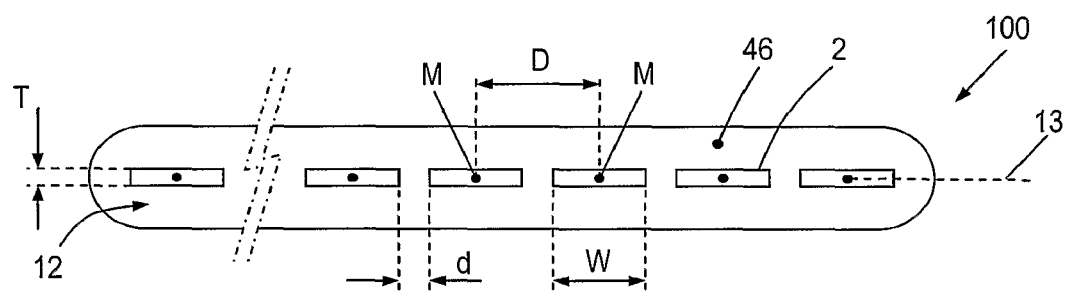
Figure 3A:
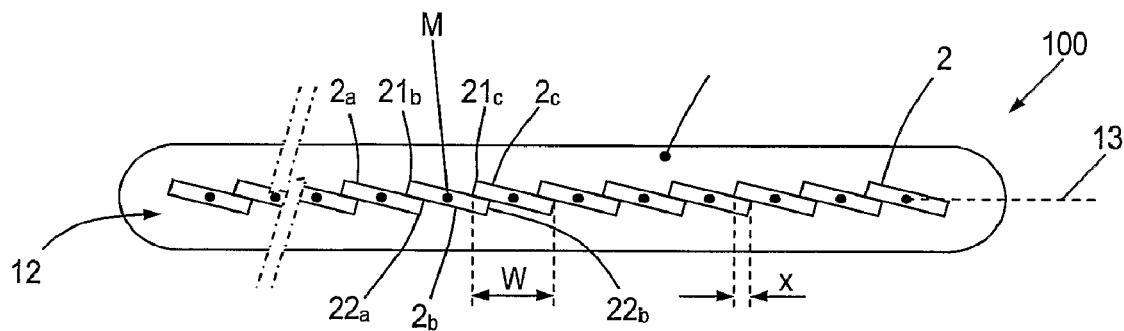
Figure 3B:
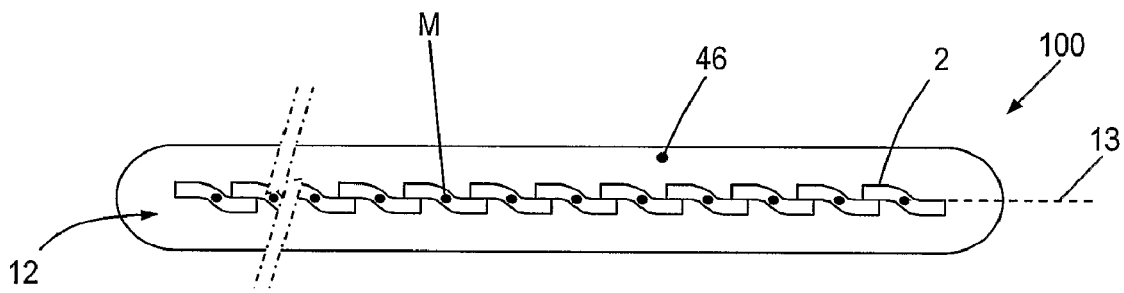
Figure 3C:
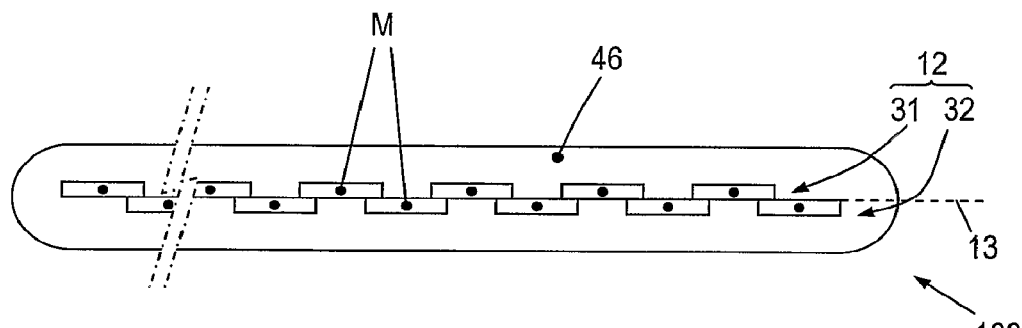
Figure 4A:
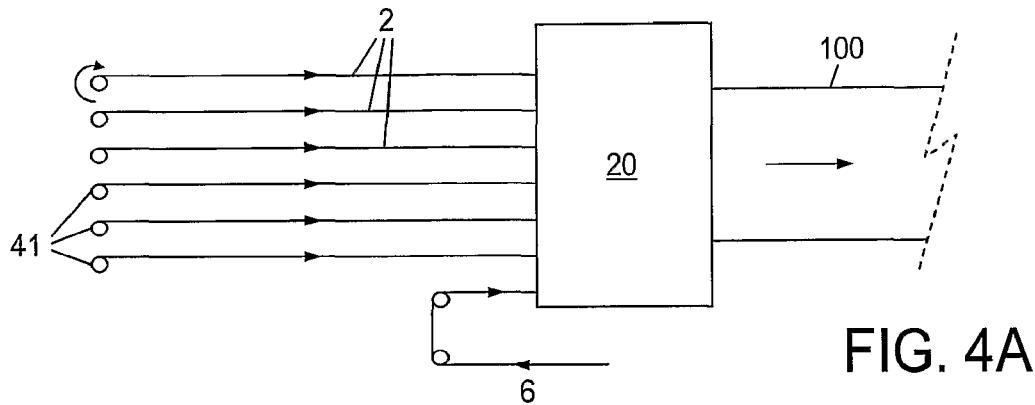
Figure 4B:
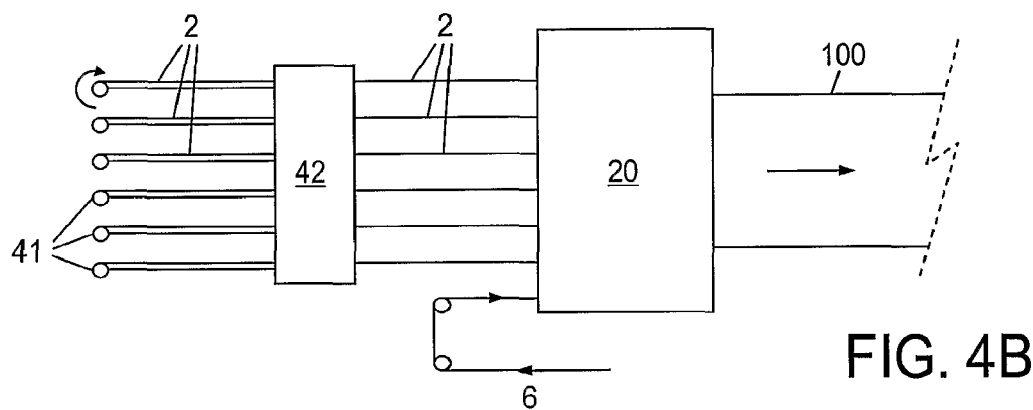
Figure 4C:
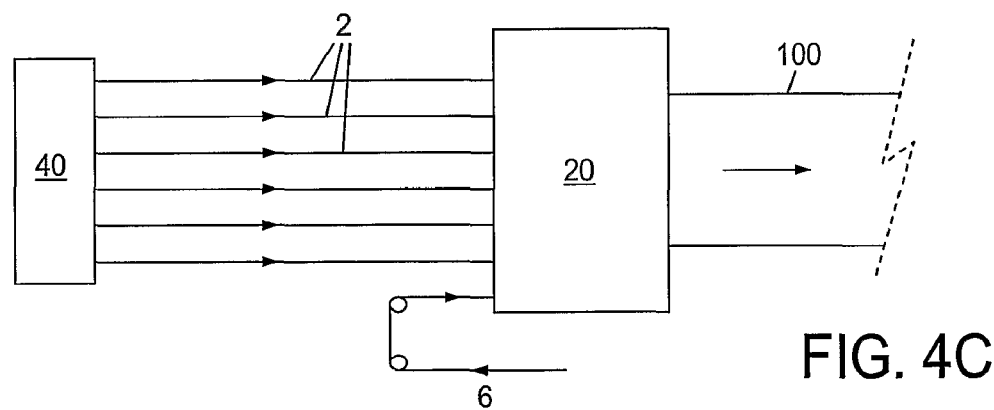
Figure 4D:
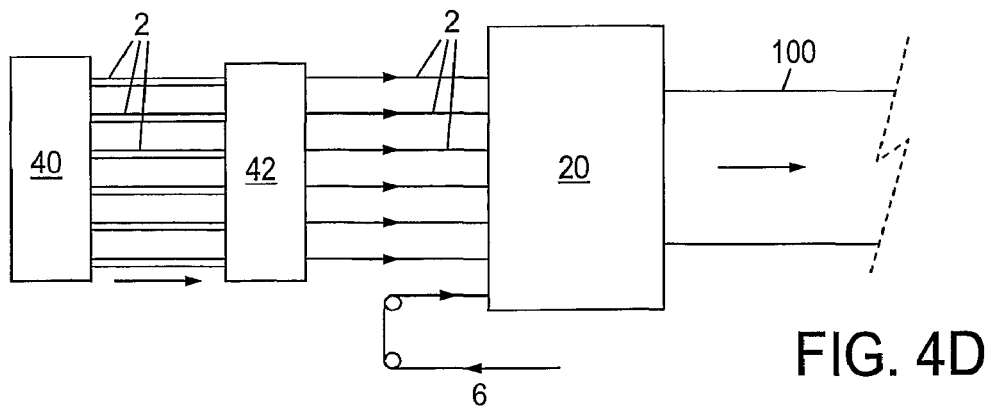
Figure 4E:
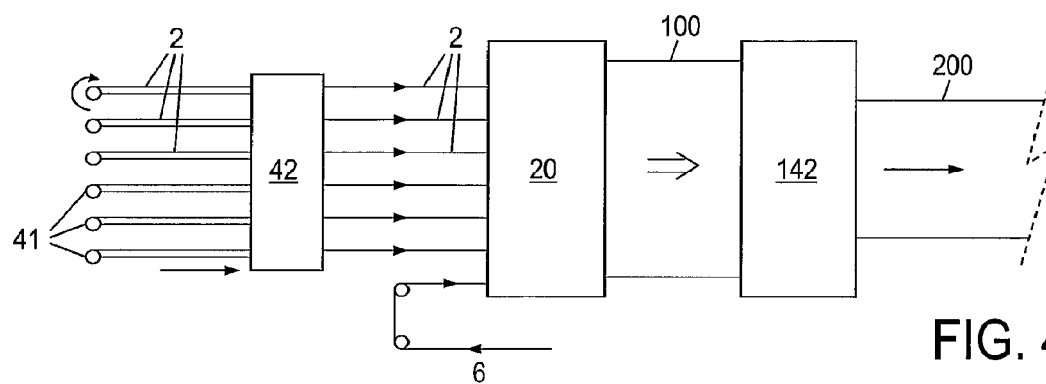
Figure 4F:
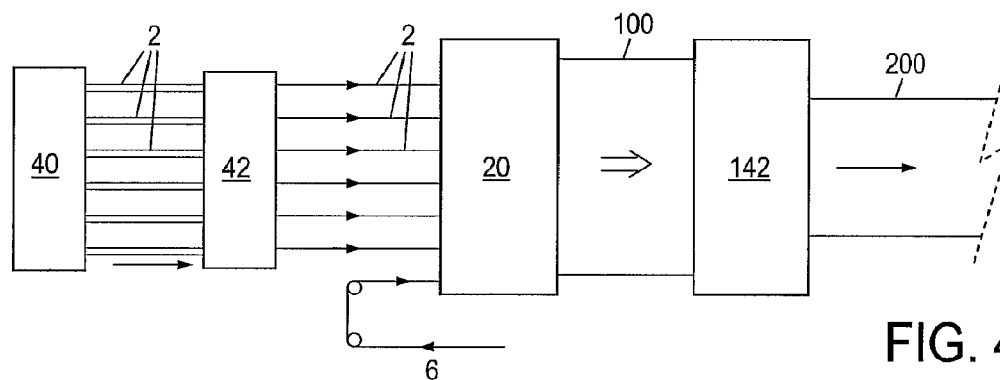
Figure 8A:
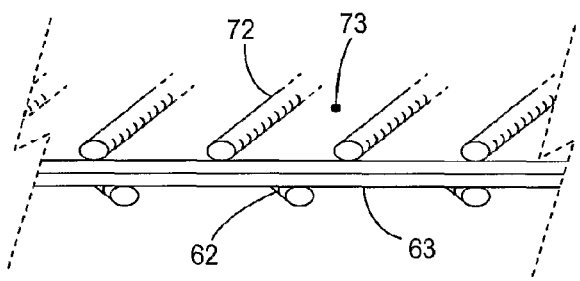
Figure 8B:
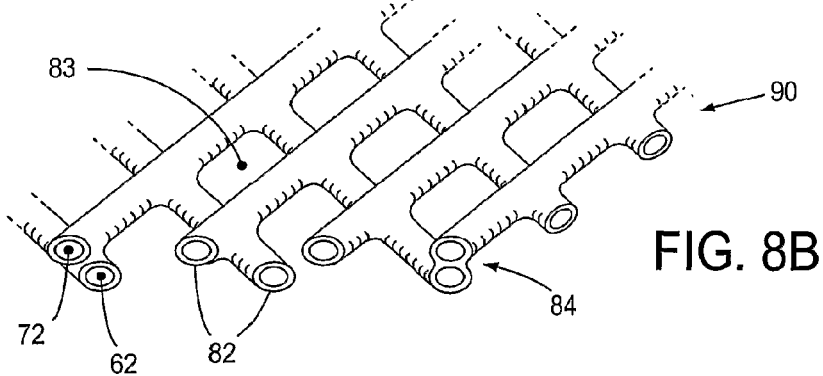
Figure 9:
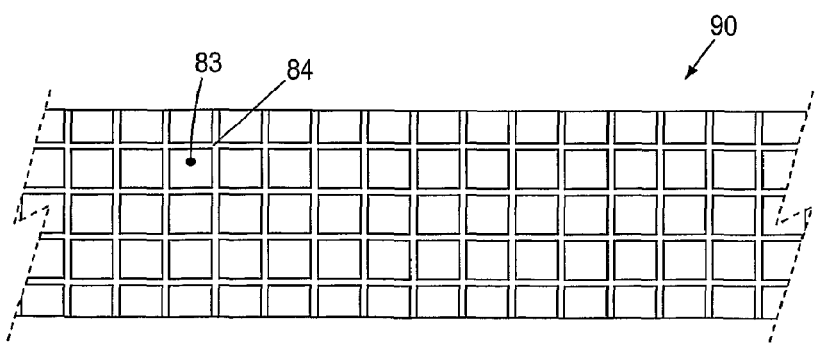
Figure 10:
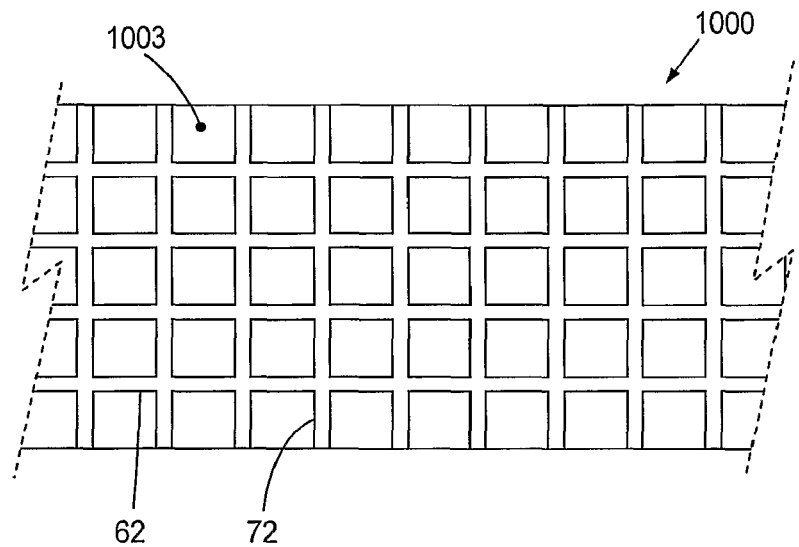
Figure 11:
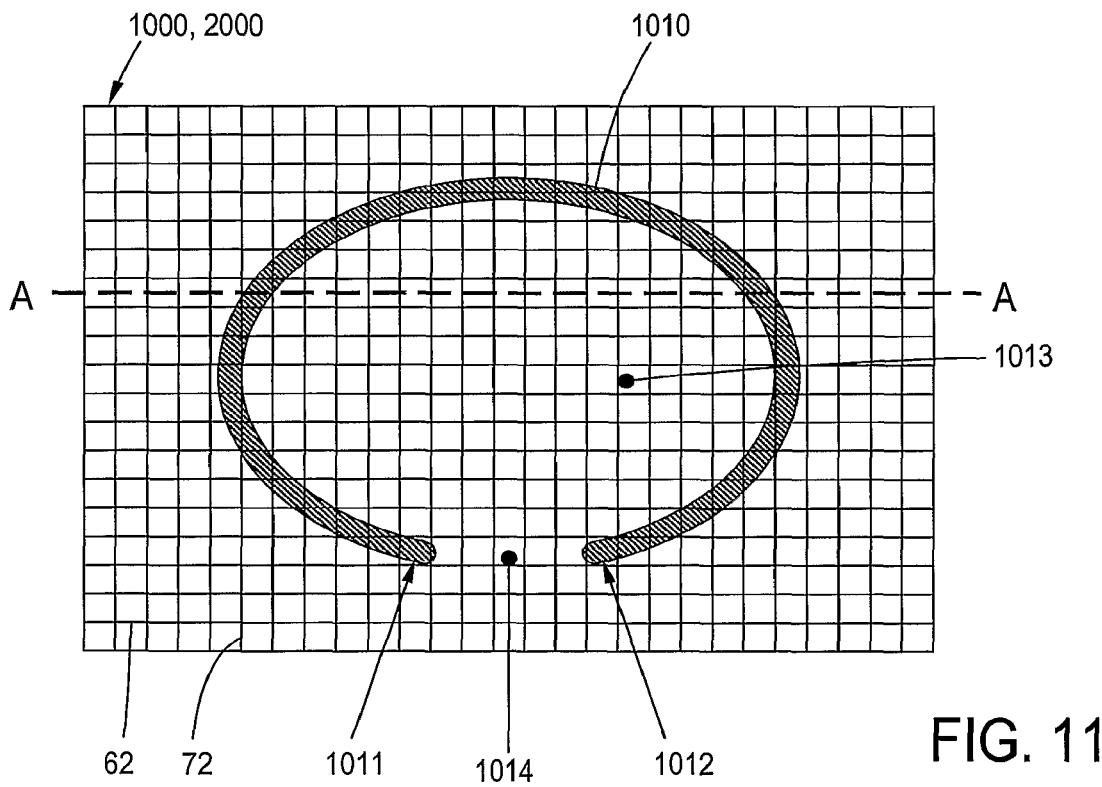
Figure 12A:
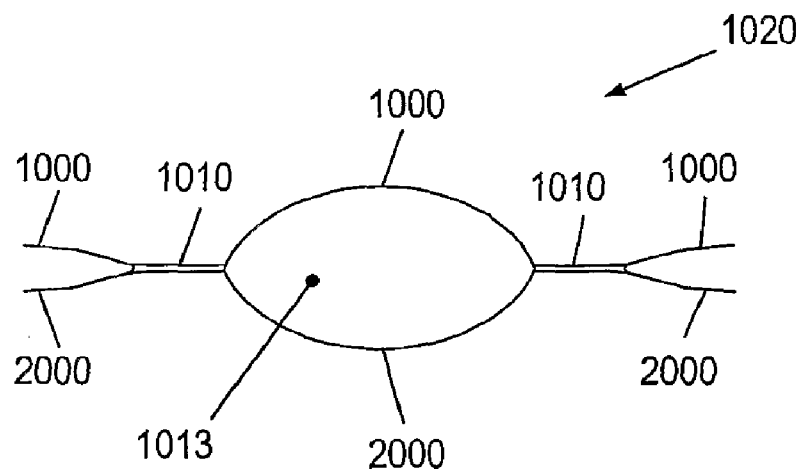
Figure 12B:
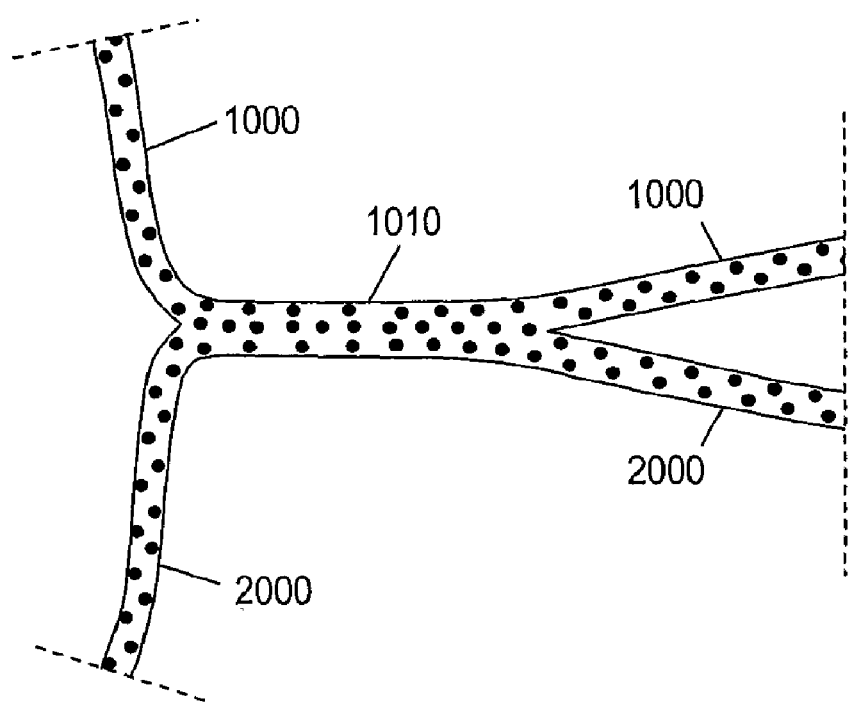

The FIGS. 2A and 2B are schematic cross sections of a part of a longitudinal fiber web;

The FIGS. 3A-C are schematic cross sections of a part of a longitudinal fiber web according to the present invention;

The FIGS. 4A-D are schematic block diagrams illustrating a manufacturing apparatus according to the present invention;

The FIGS. 4E-F are schematic block diagrams illustrating a preferred embodiment of a manufacturing apparatus according to the present invention;

FIG. 5A schematically shows a section of a multi-filament fiber;

FIG. 5B schematically shows a section of a mono-filament fiber;

FIG. 5C schematically illustrates the melting together of multiple fibers;

The FIGS. 6A-D illustrate a longitudinal fiber web for forming a fiber gauze;

The FIGS. 7A-D illustrate the making of a fiber gauze;

The FIGS. 8A-B are schematic cross sections of a fiber gauze during different stages of manufacturing thereof; and FIG. 9 is a schematic top view of an open fiber gauze;

FIG. 10 is a top view similar to FIG. 9 of a closed fiber gauze;

FIG. 11 is a top view illustrating an adhesion line for an inflatable body according to the present invention;

FIG. 12A is a schematic cross section according to the line A-A of the inflatable body of FIG. 11;

FIG. 12B shows a part of the cross section of FIG. 12A on a larger scale.

DETAILED DESCRIPTION OF THE PREFERRED EMBODIMENTS

Figure 1:
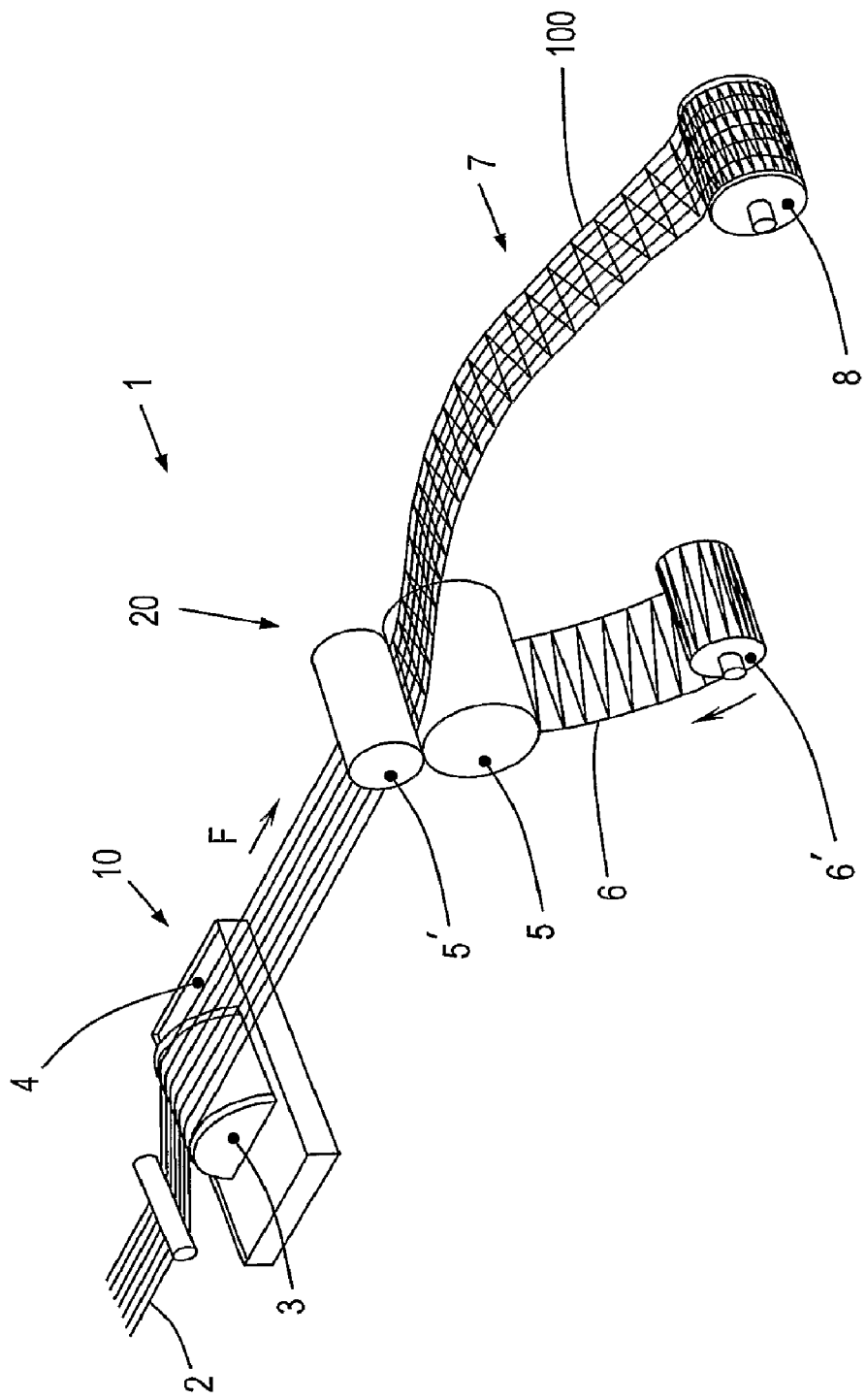
FIG. 1 schematically illustrates a process for manufacturing a longitudinal fiber web.

For background art relating to possible processes for manufacturing longitudinal fiber webs, reference is made to the Dutch patent 1006092 and the International patent application PCT/NL01/00316 (WO01/083345). Since such processes are thus known, an extensive discussion thereof can be omitted. For a brief illustration, reference is made to FIG. 1, which schematically illustrates a possible process for manufacturing a longitudinal fiber web 100. The web 100 is formed from fibers 2, which are held next to each other over a predetermined width relating to the total width of the web to be formed, which amounts to approximately 1.6 m in a particular embodiment. In this case, the longitudinal direction of the fibers corresponds to the longitudinal direction of the longitudinal fiber web. In principle, the fibers have a continuous length.

In an impregnation station 10 of a manufacturing machine 1, the fibers 2 are guided over an upper section of an impregnation roll 3, of which a lower section is submerged in a bath containing matrix material 4. A force F pulls the fibers 2 over the roll 3. Hereby, the roll 3 rotates through the matrix bath, wherein the role 3 always takes along fresh matrix material from the bath. The fibers are thus impregnated with matrix material.

The impregnated fibers 2, together with a substrate layer 6, are led to a combining station 20, where the impregnated fibers 2 are arranged on the substrate layer 6 by combination rolls 5 and 5'. The substrate layer 6 at least partially consists of a material which corresponds to the material of the fibers 2 or the matrix material 4. In a preferred embodiment, the fibers 2, the matrix material 4 and at least a part of the substrate layer 6 are made of a synthetic material, wherein the composition is chosen such that the material of the fibers 2 has the highest flow temperature. By a suitable choice of the temperature of the combining rolls 5 and 5', the material of the substrate layer 6 and/or the matrix material 4 flows, but the material of the fibers 2 does not.

In a drying route 7, the combination of fibers 2 and substrate layer 6 dries, after which the longitudinal fiber web 100 formed is wound on a roll 8.

Depending on the circumstances, such as choice of material, temperature, the fibers 2 of the longitudinal fiber web 100 lie on the substrate layer 6, or the fibers 2 have become completely embedded in the substrate layer 6.

Alternatively, it is possible that the matrix material 4 may be omitted if a suitable combination of materials of fibers 2 and substrate layer 6 allows a direct binding of the fibers 2 on or in, respectively, liquefied substrate layer material.

Thus, the longitudinal fiber web 100 formed has a bundle 12 of fibers 2 embedded in a matrix of synthetic material, which matrix hereinafter will be indicated by the reference number 46. In the following example, it will be assumed that the fibers 2 are completely embedded in the substrate layer 6, although it is actually not of essential interest whether the synthetic material of the matrix 46 originates from material 4 applied to the fibers 2 or from a substrate layer 6.

According to the state of the art, the fibers 2 are arranged as close to each other as possible, preferably even against each other. In an embodiment of the present invention, the fibers 2 have a predetermined mutual distance d.

FIG. 2A is a schematic cross section of a part of a longitudinal fiber web 100, in which it is shown that the fibers 2 of the bundle 12 are situated in a common plane 13. In FIG. 2A, the fibers 2 are shown with little mutual distance d. This distance d may be varied in the machine 1, as a result of which the average fiber weight per area unit of the longitudinal fiber web is varied, which has influence on the strength of the longitudinal fiber web as a whole. However, this distance d can not become smaller than zero.

The cross section of FIG. 2A illustrates a case in which the fibers have a substantially round transverse contour. The diameter of such fibers is typically in the range of 10 μm to several millimeters.

In the said International patent application PCT/NL01/00316 (WO01/083345) it is described that the fibers may also have a strip-like or ribbon-like shape, i.e. that they then have an elongated transverse contour. Known ribbon-shaped fibers typically have a thickness T in the range of 10-100 μm and a width W in the range of 1-5 mm. FIG. 5 of said International patent application PCT/NL01/00316 (WO01/083345) illustrates a possible process for manufacturing such ribbon-shaped fibers. FIG. 2B is a cross section similar to FIG. 2A of a part of a longitudinal fiber web 100, manufactured with application of ribbon-shaped fibers, which will hereinafter also be indicated as "tape". Also in this case, the tapes 2 lie next to each other in a common plane 13, wherein the lateral direction of the tapes 2 is directed parallel with that plane 13. The centers of the tapes 2 are indicated by M in FIG. 2B. In an embodiment of the present invention, the tapes 2 have a predetermined mutual distance d, so that the distance D between the centers M of adjacent tapes 2 is always larger than W: D=W+d.

FIG. 3A is a cross section similar to FIG. 2B of a part of a longitudinal fiber web 100 according to a first special embodiment of the present invention, wherein the average distance between the centers M of adjacent tapes 2 is always smaller than the width W. The width W of the tapes 2 is for example chosen in the range of 1-5 mm, while the thickness T is for example chosen in the range of 10-100 μm. In the example shown, the centers M are again always situated in a common plane 13, but the tapes 2 partially overlap each other. More particularly, each tape 2 has two edges 21 and 22 situated opposite each other, wherein a first edge 21b of a tape 2B is situated above the second edge 22A of a first neighbor tape 2A while the second edge 22B of the tape 2B is situated under the first edge 21c of a second neighbor tape 2c. The amount of overlap x between two adjacent tapes now determines the average distance D between the centers M according to D=W−x. It will be clear that also the average fiber weight per area unit of the web 100 is determined by this. The average fiber weight is therefore simply adjustable by setting the overlap x during the production process; this overlap x may even be varied during the production process. It will be clear that this advantage is achieved while still the thickness of the bundle 12 is substantially homogeneous, certainly on a width scale larger than the width of the tapes.

It is noted that the Japanese patent application publication 07040341 describes a process for forming a sheet-shaped product from glass fibers embedded in PVC. In that known process, two groups of glass fiber bundles are formed; in that case, each bundle consists of a plurality of glass fibers. Glass fiber bundles of the different groups are positioned partially overlapping. In melting into PVC, the different glass fibers of the overlapping bundles are partially pressed between each other. According to the present invention, however, no bundles are positioned partially overlapping, but individual ribbon-shaped fibers (tapes) are positioned partially overlapping. The said publication does not describe ribbon-shaped fibers (tapes), i.e. individual fibers with an elongated, substantially rectangular cross-sectional contour.

FIG. 3A illustrates the tapes 2 as stiff strips, of which the lateral direction makes an angle with the said common plane 13. As the overlap x becomes larger, also that angle becomes larger. In an extreme situation, the overlap x is almost equal to W, and the said angle is almost equal to 90°. In that case, the tapes 2 have their lateral direction directed perpendicular to the said common plane 13.

In reality, the tapes 2 are usually not stiff strips, but they are sufficiently flexible to adopt a Z-shaped contour, as illustrated in FIG. 3B.

FIG. 3C is a cross section similar to FIG. 3A of a part of a longitudinal fiber web 100 according to a second embodiment of the present invention, wherein the average distance between the centers M of adjacent tapes 2 is always smaller than W. Again, the tapes 2 partly overlap each other. However, in contrast with the first embodiment, where each tape 2 with its one edge 21 always lies above its one neighbor and with its other edge 22 always lies under its other neighbor, in the second embodiment, each tape 2 always lies completely above or completely beneath its two neighbors. The centers M of successive fibers 2 therefore always lie alternatingly above and beneath a plane of symmetry 13.

In fact, the bundle 12 of the second embodiment of FIG. 3C may be regarded as a combination of two partial bundles 31 and 32 situated above each other which are mutually shifted relative to each other, wherein each partial bundle is formed as illustrated in FIG. 2B. In a further elaboration, several of such partial bundles may be arranged above each other.

The FIGS. 4A-D are schematic block diagrams illustrating another important aspect of the present invention, which aspect is not exclusively applicable to fibers with a substantially rectangular cross section (FIG. 3A-B) but also to fibers with an arbitrary transverse contour, for example a (circle-) round one. In these Figs., one can always recognize the fibers 2, which in a combining station 20 are combined with a carrier layer or substrate layer 6 in order to thus form a longitudinal fiber web 100.

The fibers 2 may originate form fiber reels, which are schematically indicated by 41 in FIG. 4A. For each fiber 2 in the longitudinal fiber web 100 to be formed, a fiber reel 41 has to be mounted on a reel rack.

From the reels 41, the fibers 2 may be supplied straight to the combining station 20, possibly via an impregnating station which is not depicted here. However, it is also possible that the fibers 2 are subjected to a stretch treatment in a stretching apparatus 42 (FIG. 4B), causing the fibers to become stronger and thinner. Since suitable stretching apparatuses are known per se, it is not necessary here to give a description of the construction and functioning of such a stretching apparatus.

In a preferred embodiment, schematically illustrated in FIG. 4C, the manufacturing machine 1 comprises an extrusion device 40 with a plurality of extrusion openings (not shown for the sake of simplicity), which is adapted to supply a fiber 2 at each such extrusion opening. The extrusion device 40 is positioned directly in front of the combining station, so that the fibers 2 produced are guided straight from the extruding device 40 to the combining station 20. In a similar way as FIG. 4B, FIG. 4D illustrates that also in this case a stretching apparatus 42 may be positioned between the extruding device 40 and the combining station 20.

Also in this case, an impregnating station 10 may be positioned in front of the combining station 20, but in general this will not be necessary with fibers coming straight from the extruding device 40.

The FIGS. 4E and 4F are block diagrams similar to the FIGS. 4B and 4D, respectively, illustrating a preferred embodiment of the present invention, wherein a second stretching apparatus 142 is arranged downstream from the combining station 20, which subjects the longitudinal fiber web 100 formed to a stretching treatment. The fibers 2 of the longitudinal fiber web 100 are heated in that second stretching apparatus 142, undergo a second stretching treatment, and cool down again. By thus stretching the fibers in two stages, it is achieved that the fibers 2 get a higher strength and higher stiffness; if one would try to realize the same increase of strength and stiffness in a one-stage stretching process, then there is a considerably larger chance of breaking of the fibers.

As variation, it is also possible that the longitudinal fiber web 100, originating from the combining station 20, is first rolled up, after which the rolled-up longitudinal fiber web is later fed to a stretching apparatus in order to undergo a second stretching treatment. The longitudinal fiber web is then rolled off, heated so that the material becomes softer, stretched, and possibly rolled up again. Such a longitudinal fiber web will be indicated as a twice stretched web.

In the preceding, is has been mentioned that the fibers 2 are formed of a material having a higher melting temperature than the material of the substrate layer 6. In that case, the individual fibers may be of synthetic material, but the fibers may for example also be glass fibers, or another suitable material. In a particular preferred embodiment, each individual fiber comprises one or more filament cores 51 embedded in a fiber body 52, as illustrated in the FIGS. 5A and 5B. FIG. 5A illustrates a fiber 53 in multi-filament embodiment; FIG. 5B illustrates a fiber 54 in mono-filament embodiment. In this embodiment, each filament 51 has a higher melting temperature than the fiber body 52. In a suitable embodiment, the fiber body 52 is made of a synthetic material, for example PP, PVC, etc. The filaments 51 may be made of the same material as the fiber body 52, but the filaments 51 may also be made of another material, for example glass fiber. The FIGS. 5A and 5B clearly show that each individual fiber 53, 54 as a whole has a "solid" structure, which is here "filled" with different parts, namely filament and fiber body.

Such fibers, which will hereinafter commonly be indicated as composed fibers 55, may be formed in a relatively simple way by the extruding device 40, as will be clear to a person skilled in the art, and as will be explained hereinafter only briefly. In a first variation, the extruding device 40 only supplies the material of the fiber body 52. The extrusion openings have the shape of a ring, which surrounds a passage hole (or multiple passage holes). A pre-manufactured filament is pulled through the passage hole, and the material flowing out of the ring-shaped extrusion opening forms a sheath surrounding that filament.

In a second variation, the extruding device 40 also supplies the material of the filaments. The extruding device 40 again has extrusion openings in the shape of a ring. Each ring-shaped extrusion opening surrounds an inner extrusion opening. A first material is extruded through the inner extrusion opening, for forming the filaments 51. A second material with lower melting temperature is extruded through the ring-shaped extrusion openings, for forming the fiber bodies 53 embedding the filaments.

In the preceding, with reference to the International patent application PCT/NL01/00316 (WO01/083345), a possible method for forming ribbon-shaped fibers (tapes) 2 has been described. FIG. 5C schematically illustrates another possible method, wherein one starts from the composite fibers 55 described in the above, i.e. mono-filament fibers 54 or multi-filament fibers 53. In that case, a bundle of composite fibers 55 is taken (left-hand side in FIG. 5C), which bundle is subjected to a heat treatment wherein the fiber bodies 52 do melt but the filaments 51 do not. Hereby, the individual fibers 55 melt together. In a shaping step, the bundle melted to a whole is formed to a fiber 2 with a ribbon-shaped cross section (right-hand side in FIG. 5C). It is noted that this aspect of the invention may also be advantageously applied for forming fibers with a non-ribbon-shaped cross section, for example a circle-round cross section.

A ribbon-shaped fiber which is formed by letting a bundle of composite fibers 55 melt together will also be indicated as composite tape.

A method for manufacturing a fiber gauze will now be described.

In a first step, a longitudinal fiber web 61 is formed, form example in a way as described in the preceding, with fibers 62 and a substrate layer 63. The fibers 62 are mutually substantially parallel, and have a certain mutual intermediate space. FIG. 6A is a schematic top view on a part of such a longitudinal fiber web, whereas the FIGS. 6B-6D illustrate cross sections of different embodiments of such a longitudinal fiber web. The fibers 62 may be fibers as described in the preceding, i.e. composite fibers (multi-filament; mono-filament) or substantially consisting of one single material. The diameter of the fibers may be small, in the range 1-100 μm, but the fibers may also be macroscopic fibers with a diameter in the order of 0.1 mm to more than a mm. The fibers may also be ribbon-shaped fibers (tapes). The fibers 62 may lie on a surface of the substrate layer 63 (FIG. 6B), but the fibers 62 may also be completely integrated, i.e. embedded, in the substrate layer 63 (FIG. 6C). As variation on FIG. 6B, FIG. 6D shows that the fibers 62 may be arranged on both surfaces of the substrate layer 63, wherein the fibers 62 on both surfaces are then preferably shifted relative to each other. Further, a combination of the integrated embodiment of FIG. 6C with the embodiment of FIG. 6B or 6D is possible.

Hereinafter, a longitudinal fiber web 61 according to the FIG. 6B or 6D will be indicated as a web with external fibers 62, and a longitudinal fiber web 61 according to FIG. 6C will be indicated as a web with internal fibers 62.

In the same way, a second longitudinal fiber web 71 is formed which may be identical to the first longitudinal fiber web 61 as regards to construction.

In a next step, web segments 75 are cut or sheared from the second longitudinal fiber web 71, which segments 75 are laid on the first longitudinal fiber web 61, in such a way that their fibers 72 make an angle with the fibers 62 of the first longitudinal fiber web 61. In a preferred embodiment, this angle amounts to approximately 90°, in which case also the cutting lines 74 with which said second longitudinal fiber web 71 is cut in segments 75 make an angle of substantially 90° with the longitudinal direction of that other longitudinal fiber web 71.

Figure 7A:
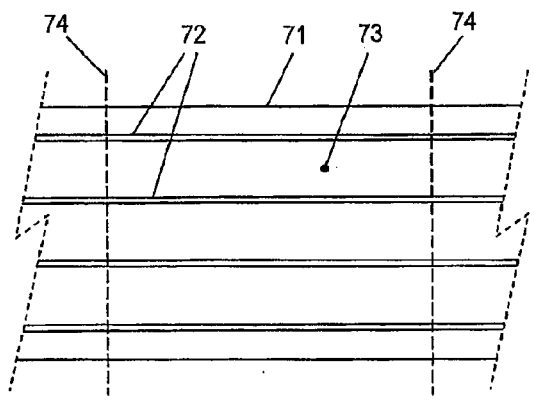
Figure 7B:
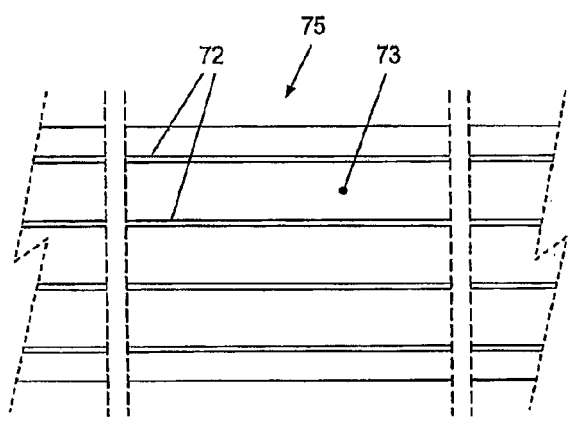
Figure 7C:
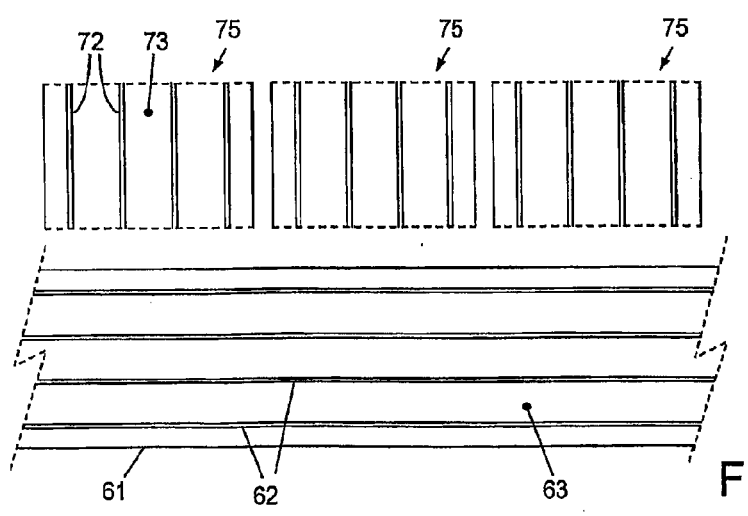

FIG. 7 is a schematic top view showing this second longitudinal fiber web, with fibers 72 and substrate layer 73 (at A; only a small number of fibers 72 is shown for the sake of clarity), which second web 71 is cut along cutting lines 74 to segments 75 (at B), which are placed on the first longitudinal fiber web 61 (at C (on smaller scale than at A and B) and D; for the sake of clarity, the segments 75 and the first longitudinal fiber web 61 are shown loose form each other in FIG. 7C).

It is noted that this second longitudinal fiber web 71 may have a construction identical to that of the first longitudinal fiber web 61, but that is not essential. It may even offer advantages if the first and second webs 61 and 71 have mutually different constructions, wherein a suitable combination of constructions and corresponding properties such as tensile strength then yields a combination product with particular desired mechanical properties.

Figure 7D:
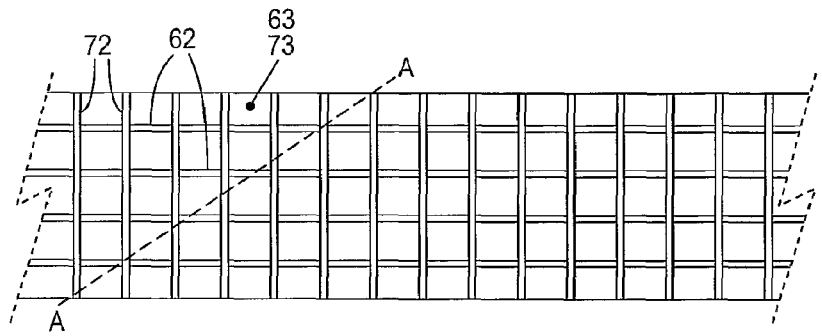

FIG. 8A is a schematic perspective section according to the line A-A in FIG. 7D, for an exemplary embodiment in which the webs 61 and 71 have external fibers 62 and 72, while the substrate layers 63 and 73 of the webs 61 and 71 are placed on each other. Alternatively, however, it is also possible that the fibers 62 and 72 are placed against each other, sandwiched between the substrate layers 63 and 73. Especially in this alternative embodiment, strong nodal points will be formed at the junctions of the fibers, because here three layers on top of each other then come into being. It is also possible that the fibers of one web (for example 71) are arranged against the substrate layer of the other web (for example 61). These alternatives are not illustrated separately for the sake of simplicity.

It may be clear that an assembly of a first longitudinal fiber web 61 with segments 75 of a second longitudinal fiber web 71 positioned transversely thereto may also be formed if the first longitudinal fiber web 61 and/or the second longitudinal fiber web 71 are implemented as type with internal fibers 62 and/or 72 (see FIG. 6C) or as type with external fibers 62 and/or 72 on both sides (see FIG. 6D).

In a next step, the assembly of the first longitudinal fiber web 61 with the segments 75 of the second longitudinal fiber web 71 positioned transversely thereto is subjected to a heat treatment, which results in the carrier layers 63 and 73 melting together, while the carrier layers 63 and 73 retract from the, in this case, square spaces 83 between the fibers 62 and 72 and substantially surround those fibers (see FIG. 8B).

Depending on circumstances such as choice of material, it is possible that this melting together and retracting occurs at the same time, and it is possible that the carrier layers 63 and 73 retract from the intermediate spaces 83 without further measures being needed. However, it is preferable to provide means capable of perforating the carrier layers 63 and 73 at the positions of those intermediate spaces 83. Such perforation means may for example comprise mechanical perforation means (such as needles moving up and down), or for example a hot-air flow. Perforating may for example be performed preceding the said heat treatment, or just after that. In a preferred embodiment, the assembly of the first longitudinal fiber web 61 with the segments 75 of the second longitudinal fiber web 71 placed transversely thereon are first subjected to a first heat treatment, resulting in the carrier layers 63 and 73 melting together, subsequently, the perforation step is performed, and subsequently, the assembly which in the meantime has melted to a whole is subjected to a second heat treatment at a higher temperature than the first heat treatment, in order to accomplish that the carrier layers which in the meantime have been perforated and melted together retract from the intermediate spaces 83.

The result is an open fiber gauze 90, as illustrated in the FIGS. 8B and 9. In FIG. 8B, the material of the (former) carrier layers melted together is indicated by the reference number 82; it can be seen that the substrate layer material 82 completely surrounds the fibers 62 and 72 crossing each other (which, in practice, will not always be accomplished but is after all not necessary), wherein a reinforcement is achieved at the crossing points (for example at 84) in particular.

Hereinafter, a method for manufacturing an airbag will be described. It is noted that the invention is applicable just as well to manufacturing other hollow, foldable and inflatable bodies. In a first step, a longitudinal fiber web is formed, wherein the fibers are arranged on a carrier layer or embedded between two carrier layers, in which longitudinal fiber web the fibers have mutual intermediate spaces.

From a second longitudinal fiber web, which is composed in a similar way, pieces are cut which, rotated over a suitable angle (preferably 90°), are placed on the first longitudinal fiber web.

The combination of these two webs is subjected to a heat treatment in order to melt these two webs together. Thus, a cross fiber web (cross-ply) 1000 is formed, as illustrated in FIG. 10. So far, the process may be equal to what has been discussed in the preceding with reference to the FIGS. 6A-D, 7A-D, and 8A, and these Figs may just as well be regarded as illustrations with the present method, wherein the reference numbers used are maintained. In fact the only, essential, difference between the gauze 90 of FIG. 9 and the cross-ply 1000 of FIG. 10 is that the gauze 90 is an open gauze, with open intermediate spaces 83 between adjacent fibers 62, 72, while the heat treatment for melting the longitudinal fiber web 61 and the segments 75 of the transverse fiber web 71 together for forming the cross-ply 1000 is performed in such a way that the carrier layers 63 and 73 do melt together over their entire surface but otherwise remain intact. The intermediate spaces between the fibers 62 and 72, which are substantially square in the exemplary embodiment of FIG. 10, are thus filled with carrier material 1003. Thus, the cross-ply 1000 is a closed fiber gauze that is air-tight. Such a closed fiber gauze combines the desired properties of strength and flexibility.

In a similar way, a second closed fiber gauze 2000 is formed which, as to construction and manufacturing, may be identical to the first closed fiber gauze 1000. This second fiber gauze 2000 is placed on the first fiber gauze 1000.

Subsequently, the two fiber gauzes 1000 and 2000 are locally subjected to a heat treatment in order to let the two fiber gauzes 1000 and 2000 locally melt together. The melting spots together define a continuous line, which will be indicated as sealing line 1010, and which, in top view, as illustrated in FIG. 11, has a curved contour with ends 1011 and 1012 lying closely together. The sealing line 1010 defines an inner space 1013 between both fiber gauzes 1000 and 2000, which inner space is completely closed off from the outside world by the gauzes 1000, 2000 and the sealing line 1010, except for an entrance opening 1014 defined by the mutual distance of the said ends 1011 and 1012.

Air can be brought into the space 1013 through this entrance opening 1014. The gauzes 1000 and 2000 then move away from each other, but are held together at the sealing line 1010. This situation is illustrated in FIG. 12A. In general, the gauze parts outside the sealing line 1010 do not have a function; in that case, they may be cut away. What remains is an inflatable body 1020, of which the contour is mainly defined by the contour of the sealing line 1010. In the case of a driver airbag, this contour will typically be almost round. In the case of a roll-over airbag, the total contour of the inflatable body will be more elongated, and the sealing line will have a comb-shaped contour in order to define multiple mutually parallel air chambers.

FIG. 12B shows a schematic cross section of the sealing line 1010 on larger scale, in order to illustrate that at the position of the sealing line 1010, in the spaces between the fibers, the carrier layers 63, 73 of the two gauzes 1000, 2000 are melted together. A good, strong and air-tight sealing of the two gauzes 1000, 2000 is thus not obstructed by the presence of the fibers. Also, the fibers themselves are not melted together, so that the whole remains flexible.

It is noted that the above procedure may also be performed if there is little or no intermediate space 63, 73 between the fibers 62, 72, but the largest advantages are achieved if there are such intermediate spaces. Those advantages are in the field of a larger flexibility, a lower weight, and better weldability.

In a possible embodiment, the first and second gauzes 1000 and 2000 are aligned relative to each other, i.e. the fibers in the first gauze 1000 are substantially directed parallel with the fibers in the second gauze 2000. However, it is preferred that the first and second gauzes 1000 and 2000 are rotated relative to each other over, at least approximately, 45°. Then, in the area of the sealing seam 1010, there are fibers with an orientation 0°-180° and fibers with an orientation 90°-270° of the one gauze, as well as fibers with an orientation 45°-225° and fibers with an orientation 135°-315° of the other gauze. Hereby, a better stress distribution in the inflatable body in the inflated state is achieved, and there are less stress concentrations, so that the load of the sealing seam 1010 is lower. Also, more but smaller pleats come into being, and the area around the sealing seam 1010 is more flexible in the inflated state.

It will be clear to a person skilled in the art that the invention is not limited to the exemplary embodiments discussed in the preceding, but that several variations and modification are possible within the protective scope of the invention as defined in the attached claims.

For example, it is possible that a fiber bundle may comprise two or more bundles 12 of the first embodiment as illustrated in FIG. 3A or FIG. 3B on top of each other.

Further, it is possible that a cross-ply 1000 comprises multiple layers of fiber webs. In the case of three layers, it is then possible that the separate layers are rotated over 60° relative to each other. When an inflatable body is then made, the two cross-plies 1000 and 2000 may be rotated over 30° relative to each other.

What is claimed is:

1. Method for manufacturing an airbag comprising:
   providing a first longitudinal fiber web comprising a first substrate layer with arranged thereon and/or embedded therein a first set of mutually substantially parallel fibers with mutual intermediate space;
   providing a second longitudinal fiber web comprising a second substrate layer with arranged thereon and/or embedded therein a second set of mutually substantially parallel fibers with mutual intermediate space;
   cutting web segments from the second longitudinal fiber web;
   positioning the web segments of the second longitudinal fiber web onto the said first longitudinal fiber web, in such a way that the fibers of those web segments make an angle unequal to zero and preferably at least substantially equal to 90° with the fibers of the first longitudinal fiber web;
   performing a heat treatment, so that at least the substrate layers of the two webs melt together, in order to thus form a crossply; and
   placing two sheets of the crossply onto each other; locally performing a heat treatment on the two sheets of the crossply, in such a way that the carrier layers of the respective sheets locally melt together, wherein the melting spots together form a curved sealing line defining an inner space between both sheets.

2. Method according to claim 1, wherein the sealing line has two ends situated at short distance from each other, which distance defines an entrance opening to the said inner space.

3. Method according to claim 1, wherein the said heat treatment for forming the sealing line is performed in such a way that melting of fibers is avoided.

4. Method according to claim 1, wherein, before the said heat treatment for forming the sealing line is performed, both sheets are displaced relative to each other over an angle substantially equal to $\alpha/2$, wherein $\alpha$ indicates the mutual angle between the fibers of the fiber webs in the sheets.

5. Method according to claim 1, wherein the first longitudinal fiber web is provided by manufacturing with a method wherein synthetic tapes with an elongated cross-sectional contour are positioned substantially parallel to each other for forming a bundle, wherein the tapes are embedded in a matrix material; and
   wherein the fibers are positioned partially overlapping each other.

6. Method according to claim 1, wherein the second longitudinal fiber web is provided by manufacturing with a method wherein synthetic tapes with an elongated cross-sectional contour are positioned substantially parallel to each other for forming a bundle, wherein the tapes are embedded in a matrix material; and
   wherein the fibers are positioned partially overlapping each other.

7. Method according to claim 5, wherein the matrix material is adapted to the material of the tapes and has a flow temperature which is lower than the material of at least a part of the tapes.

8. Method according to claim 7, wherein the combination of the matrix material and the material of the tapes is subjected to a heat treatment, wherein the temperature is increased to a maximum value within a temperature range which is chosen such that the matrix material flows with certainty while the material of the tapes with certainty does not flow.

9. Method according to claim 1, wherein the first longitudinal fiber web is provided by manufacturing with a method wherein fibers are positioned substantially parallel to each other for forming a bundle, wherein the fibers are embedded in a matrix material;

wherein a fiber comprises at least one multi-filament fiber, with multiple filament cores embedded in a fiber body.

10. Method according to claim 1, wherein the second longitudinal fiber web is provided by manufacturing with a method wherein fibers are positioned substantially parallel to each other for forming a bundle, wherein the fibers are embedded in a matrix material; and wherein a fiber comprises at least one multi-filament fiber, with multiple filament cores embedded in a fiber body.

11. Method according to claim 6, wherein a fiber comprises at least one mono-filament fiber, with a filament core embedded in a fiber body.

12. Method according to claim 9, further comprising a feature selected from the group comprising:

a filament has a higher melting temperature than the fiber body;
a filament is made of the same material as the fiber body;
the fiber body is made of a synthetic material, for example PP, PA, PES, PE, etc;
a filament is made of a material differing from the material of the fiber body, wherein the filament is preferably made of glass fiber or synthetic material;
a fiber is made by subjecting a bundle of composite fibers to a heat treatment so that the fiber bodies thereof melt together; and
in a forming step, a bundle of composite fibers which is melted together is formed to a tape with a substantially ribbon-shaped cross-sectional contour or to a fiber with a round cross-sectional contour.

13. Method according to claim 5, wherein the fibers are directly received from an extruding device.

14. Method according to claim 5, wherein fibers are arranged on a substrate layer, and wherein the combination of the substrate layer and the fibers is subjected to heat a treatment, wherein the temperature is increased to a maximum value within a temperature range which is chosen such that the substrate layer material flows with certainty while the material of at least a part of the fibers with certainty does not flow.

15. Method according to claim 14, wherein the fibers are composite fibers, with one or more filament cores embedded in a fiber body, and wherein the said temperature range is chosen such that the material of the fiber body flows while the material of the filament cores does not flow.

16. Method according to claim 14, wherein the fibers are subjected to a stretch treatment before they are joined together with the substrate layer.

17. Method according to claim 9, wherein the fibers are positioned next to each other with intermediate spaces.

18. Method according to claim 14, wherein the combination of the substrate layer and the fibers is heated and then subjected to a stretch treatment.

19. Method according to claim 1, wherein the first longitudinal fiber web comprises a bundle of mutually substantially parallel synthetic tapes with an elongated cross-sectional contour embedded in a matrix material; and wherein the tapes partially overlap each other.

20. An airbag comprising two sheets of a crossply positioned on each other and locally melted together, wherein each crossply comprises at least two fiber webs positioned on each other under an angle and melted together.

21. Airbag according to claim 20, obtainable by means of the manufacturing method according to claim 1.

22. Device for manufacturing an airbag comprising:

first fiber web providing means for providing a first longitudinal fiber web comprising a first substrate layer with arranged thereon and/or embedded therein a first set of mutually substantially parallel fibers with mutual intermediate space;
second fiber web providing means for providing a second longitudinal fiber web comprising a second substrate layer with arranged thereon and/or embedded therein a second set of mutually substantially parallel fibers with mutual intermediate space;
cutting means for cutting web segments from the second longitudinal fiber web;
positioning means for positioning the web segments of the second longitudinal fiber web onto the said first longitudinal fiber web, in such a way that the fibers of those web segments make an angle unequal to zero and preferably at least substantially equal to 90° with the fibers of the first longitudinal fiber web;
heating means arranged for at least melting together the substrate layers of the two webs, in order to thus form a crossply;
placement means for placing two sheets of the crossply onto each other; and
heating means arranged for locally performing a heat treatment on the two sheets of the crossply in such a way that the carrier layers of the respective sheets locally melt together, wherein the melting spots together form a curved sealing line defining an inner space between both sheets.

* * * * *